(12) United States Patent
Pizzey

(10) Patent No.: US 7,595,078 B2
(45) Date of Patent: Sep. 29, 2009

(54) METHODS OF INCREASING FLAXSEED HULL RECOVERY AND RESULTANT FLAX PRODUCTS

(75) Inventor: Glenn Roy Pizzey, Angusville (CA)

(73) Assignee: Glanbia Nutritionals Ireland Limited, Kilkenny (IE)

( * ) Notice: Subject to any disclaimer, the term of this patent is extended or adjusted under 35 U.S.C. 154(b) by 415 days.

(21) Appl. No.: 11/079,335

(22) Filed: Mar. 15, 2005

(65) Prior Publication Data

US 2006/0210691 A1    Sep. 21, 2006

(51) Int. Cl.
  *A23L 1/025*    (2006.01)
  *A23L 1/182*    (2006.01)
(52) U.S. Cl. .............. 426/618; 426/478; 426/481; 426/483; 426/484; 426/507; 426/518
(58) Field of Classification Search ................ 426/618, 426/478, 481, 483, 484, 507, 518, 74, 620, 426/615, 640, 639, 658
See application file for complete search history.

(56) References Cited

U.S. PATENT DOCUMENTS

| | | | |
|---|---|---|---|
| 2,975,066 A * | 3/1961 | Baker et al. ................. | 426/543 |
| 4,325,882 A | 4/1982 | Reiners ................... | 260/412.4 |
| 5,408,924 A | 4/1995 | Arendt et al. ................ | 99/516 |
| 5,466,188 A | 11/1995 | Schaal et al. ................. | 460/24 |
| 5,705,618 A | 1/1998 | Westcott et al. ............. | 530/500 |
| 5,846,944 A | 12/1998 | Prasad ......................... | 514/25 |
| 5,925,401 A | 7/1999 | Kankaanpää-Anttila et al. ............................. | 426/656 |
| 6,261,565 B1 | 7/2001 | Empie et al. ............. | 424/195.1 |
| 6,264,853 B1 | 7/2001 | Westcott et al. ................ | 252/1 |
| 6,368,650 B1 | 4/2002 | Pizzey ........................ | 426/518 |
| 6,391,308 B1 | 5/2002 | Empie et al. ............. | 424/195.1 |
| 6,391,309 B1 | 5/2002 | Empie et al. ............. | 424/195.1 |
| 6,391,310 B1 | 5/2002 | Empie et al. ............. | 424/195.1 |
| 6,395,279 B1 | 5/2002 | Empie et al. ............. | 424/195.1 |
| 6,399,072 B1 | 6/2002 | Empie et al. ............. | 424/195.1 |
| 6,440,479 B1 | 8/2002 | Myllymäki ................. | 426/483 |
| 6,451,849 B1 | 9/2002 | Ahotupa et al. ............. | 514/473 |
| 6,486,126 B1 | 11/2002 | Prasad ......................... | 514/25 |
| 6,498,145 B1 | 12/2002 | Prasad ......................... | 514/25 |
| 6,509,381 B2 | 1/2003 | Empie et al. ................ | 514/783 |
| 6,518,319 B1 | 2/2003 | Empie et al. ................ | 514/783 |
| 6,673,773 B2 | 1/2004 | Prasad ......................... | 514/25 |
| 6,689,809 B2 | 2/2004 | Ahotupa et al. ............. | 514/473 |
| 6,767,565 B2 | 7/2004 | Shukla et al. ............... | 424/768 |
| 6,806,356 B2 | 10/2004 | Dobbins et al. ............. | 530/500 |
| 2001/0016590 A1 | 8/2001 | Ahotupa et al. ............. | 514/310 |
| 2002/0061854 A1 | 5/2002 | Ahotupa et al. ............... | 514/22 |
| 2002/0168433 A1 | 11/2002 | Empie et al. ................ | 424/757 |
| 2003/0003168 A1 | 1/2003 | Empie et al. ................ | 424/757 |
| 2003/0055227 A1 | 3/2003 | Shukla et al. ............... | 530/507 |
| 2003/0060420 A1 | 3/2003 | Heintzman et al. ............ | 514/22 |
| 2003/0064938 A1 | 4/2003 | Empie et al. ................. | 514/27 |
| 2003/0131737 A1 | 7/2003 | Cui et al. ....................... | 99/519 |
| 2003/0136276 A1 | 7/2003 | Cui et al. ....................... | 99/519 |
| 2003/0165607 A1 | 9/2003 | Sipila .......................... | 426/601 |
| 2003/0180436 A1 | 9/2003 | Pizzey ........................ | 426/615 |
| 2003/0212007 A1 | 11/2003 | Prasad ......................... | 514/25 |
| 2003/0216553 A1 | 11/2003 | Dobbins et al. ............. | 530/500 |
| 2004/0034241 A1 | 2/2004 | Empie et al. ................. | 552/540 |
| 2004/0048804 A1 | 3/2004 | Ahotupa et al. ............... | 514/22 |
| 2004/0156887 A1 | 8/2004 | Auriou ....................... | 424/450 |
| 2004/0224902 A1 | 11/2004 | Shukla et al. .................. | 514/22 |

FOREIGN PATENT DOCUMENTS

| | | |
|---|---|---|
| CA | 2167951 C | 7/1997 |
| EP | 0389631 A1 | 10/1990 |
| EP | 1466609 A1 | 10/2004 |
| EP | 1471070 A1 | 10/2004 |
| EP | 1477178 A2 | 11/2004 |
| WO | WO 96/30468 | 10/1996 |
| WO | WO 97/14670 | 4/1997 |
| WO | WO 00/19842 | 4/2000 |
| WO | WO 2004/010965 | 2/2004 |
| WO | WO 2004/012697 | 2/2004 |

(Continued)

OTHER PUBLICATIONS

Hsu, K.H. A Theoretical Approach to the Tempering of Grains. Cereal Chem 61:466-470. abstract, 2984 American Association of Cereal Chemists, Inc.*

(Continued)

*Primary Examiner*—Helen F Pratt
(74) *Attorney, Agent, or Firm*—Haynes and Boone, LLP

(57) ABSTRACT

The present invention relates to a method for increasing the amount of hull portions recovered from flaxseeds. In a preferred embodiment, the invention includes providing a plurality of harvested flaxseeds, tempering the harvested flaxseeds by sufficiently increasing the moisture content for at least about one-half hour to increase the amount of hulls recovered from the flaxseeds, and recovering a portion of the hulls from the moisture-increased flaxseeds. The claimed invention also relates to a flaxseed hull isolate that includes at least 7 up to 17 weight percent of flaxseed hull based on the total weight of flaxseeds. Additionally, the claimed invention relates to a harvested flaxseed, whose moisture content is increased by at least about 1 weight percent, and a flax product having a lignan concentration of at least 10 percent by weight.

22 Claims, No Drawings

FOREIGN PATENT DOCUMENTS

WO 2006/105651 A1 * 10/2006

OTHER PUBLICATIONS

LinumLife Webpage; Home. http://www.linumlife.com/common.asp?id=89&instantie=0&cmtSessie=;© 2003.

LinumLife Webpage; LinumLife EXTRA. http://www.linumlife.com/common.asp?id=184&instantie=0&cmtSessie=; © 2003.

LinumLife Webpage; LinumLife for manufacturers. http://www.linumlife.com/common.asp?id=2256; © 2003.

LinumLife Webpage; LinumLife articles. http://www.linumlife.com/common.asp?id=2242&instantie=0&cmtSessie=; © 2003.

* cited by examiner

METHODS OF INCREASING FLAXSEED HULL RECOVERY AND RESULTANT FLAX PRODUCTS

FIELD OF THE INVENTION

The present invention relates to a method for recovering increased amounts of flaxseed hulls from harvested flaxseeds, in particular, by increasing the moisture content of the flaxseeds before separating the hulls from the harvested flaxseeds.

BACKGROUND OF THE INVENTION

Flaxseeds are typically flat, oval, and pointed at one end. They contain a seed coating and an embryo comprising two large, flattened cotyledons, a short hypocotyl and a radical. The seed coating (or hull) of flaxseeds is formed from the ovule and has five hull layers, two of which are considered important. These two hull layers are the epidermal layer, commonly called the mucilage layer, and the testa that consists of pigmented cells, which determine the seed's coloring.

Typically, various abrasion methods have been implemented in dehulling flaxseeds. The oil of flaxseeds may be separated by pressing or extracting it from the whole grain. Flaxseeds have been cultivated in Canada and the USA primarily for oil. The solid residue has been typically used as an animal feed.

Full fat milled seed typically refers to flaxseeds milled by any suitable milling process including grinding and impact techniques where the whole seed is milled without any prior extraction of oil or other components. Defatted flax meal refers to flax meal made from flaxseeds from which oil has been extracted therefrom.

One of the major benefits of processing flaxseeds into a nutritional supplement for humans is that they naturally contain a lignan portion in an amount of roughly 0.7 percent up to 1.5 percent. The primary lignan of flaxseeds is secoisolariciresinol diglycoside (SDG), which is found in a concentration of up to about 1.5 weight percent based on the total weight of the flaxseed. Plant lignans are believed to hold special pharmaceutical benefits inasmuch as they are reported to exhibit broad biological activities, including antitumor, antioxidant, antiviral and estrogenic and antiestrogenic activities. The lignans are generally cinnamic acid dimers containing a dibenzylbutane skeleton. Another benefit of consuming flaxseeds is that they are a rich source of essential fatty acids. It is believed that a daily human consumption of 250 mg of lignan are required to produce some of the beneficial health effects listed above. This, however, equates to the consumption of about 25 g of flaxseed per day, which is an impractical and prohibitive amount for normal daily intake.

With respect to the processing of lignans from flaxseeds, a large portion of the lignans are contained in the flaxseed hulls. Previous efforts for recovering lignans from flaxseeds have included physical abrasion of the flaxseeds to remove a portion of the hulls. It is believed that hull recovery processes that incorporate only dry fractionation have not been able to recover SDG lignans in amounts exceeding roughly 3 weight percent of the total weight of the resultant purified flax product. Other methods of recovering SDG lignans include chemical extraction of the lignans from the flaxseed hulls, which can recover SDG in amounts of up to 95 weight percent of the total weight of the resultant purified flax product. A well known problem, however, of using chemical-type extractions involves the use of environmentally damaging solvents, or more expensive solvents or measures to ensure that dangerous solvents are not released and are properly disposed of.

One previous method involving the dehulling of flaxseeds discloses physically separating hull from its embryo layer by removing moisture upon heating or other drying methods. In particular, Canadian Patent No. 2,167,951 to Cui et al. discloses that flaxseed without drying was not suitable for the dehulling process and that separation of the hull layer from the embryo upon heat treatment was essential for flaxseed to be dehulled mechanically. U.S. Patent Application No. 2003/0131737 to Cui et al. further teaches the drying of flaxseed to reduce the moisture content to about 1 percent or less before being introduced to a separation chamber for abrasive processing.

Thus, it is still desired to provide for flaxseed hull recovery processes that increase the amount of hull recovered.

SUMMARY OF THE INVENTION

The present invention relates to a method for increasing the amount of hull portions recovered from flaxseeds. In one embodiment, the invention includes providing a plurality of harvested flaxseeds, tempering the harvested flaxseeds by sufficiently increasing the moisture content for at least about one-half hour to facilitate recovery of an increased amount of hull portions from the flaxseeds, and recovering a portion of the hulls from the moisture-increased flaxseeds.

In one embodiment, the moisture content of the flaxseeds is increased by adding an aqueous component that includes water. In a preferred embodiment, the aqueous component is water. In another embodiment, the moisture content of the flaxseeds is increased to greater than 10 weight percent. In a preferred embodiment, the moisture content is increased to about 10.5 to 20 weight percent. In one more preferred embodiment, the moisture content is increased to about 12 to 15 weight percent. In another variant of the invention, the moisture content is increased by about 1 weight percent, preferably by about 2 weight percent, and more preferably by about 3 weight percent.

In one preferred embodiment, the moisture content is increased over a time of about 1 to 24 hours. In one embodiment, the method includes a sorting step where it is preferable that the harvested flaxseeds are visually uniformly colored having no more than 5 percent flaxseeds that are of a visually distinguishable darker color.

In another embodiment, the recovering of hull portions includes milling the flaxseeds to separate a portion of the hulls from the remainder of the moisture-increased flaxseeds, i.e., from the inner portions. In one embodiment, the recovering occurs directly after tempering so that the flaxseed moisture water content remains substantially unchanged. In one embodiment, the hull portions may be dried after milling to reduce excess moisture content. In one optional embodiment, the invention includes sifting hull portions into a first portion that is lighter in density and coarser, and a second portion that is denser and finer in granularity, and then aspirating the first portion into a third portion of lesser density than a fourth portion of greater density. It is the resultant third portion that is the desired hull portion for recovering.

In one optional but preferred embodiment, the recovered hull portions are further processed to remove a portion of oil from the hull portion by using an oil press. The recovered hull portion is also preferably pasteurized due to the heat produced by the oil press.

The present invention also encompasses a shelf-stable flax product produced according to the method described above, i.e., one which typically has shelf stability for up to about 1 year, preferably even without refrigeration. In one preferred embodiment, the flax product has a ratio of dietary fiber content of about 30 percent to 45 percent insoluble dietary fiber compared to 55 percent to 70 percent soluble dietary fiber. In another embodiment, the flax product has an antioxidant activity of about 40,000 TE to 50,000 TE per 100 grams. In yet another embodiment, the flax product preferably has a reduced fat content of about 5 to 12 weight percent. More preferably, the flax product has a fat content of about 7 to 10 weight percent. It is also preferable that the flax product and the recovered hull portions have a sufficiently low fat content that solvent extraction of lignans can be avoided or minimized, i.e., solvent or chemical extractions are not required to produce a final commercial nutritional supplement or food component.

In one embodiment, the invention encompasses a flaxseed hull isolate that includes at least 7 up to about 17 weight percent of flaxseed hull based on the total weight of flaxseeds. In a preferred embodiment, the flaxseed hull isolate includes about 8 to 16 weight percent of flaxseed hull based on the total weight of flaxseeds.

The present invention also encompasses a harvested flaxseed, whose moisture content is increased by at least about 1 weight percent compared to an untempered flaxseed.

In yet another embodiment, the invention encompasses a flax product comprising lignans, fibers, and fats, wherein the lignan concentration is at least 10 weight percent. In a preferred embodiment, the fiber content of the flax product is sufficient to generate a prebiotic bacteria culture in a mammalian large intestine when consumed so as to convert plant lignan to mammalian lignan. In a more preferred embodiment, at least as many soluble fibers are included as insoluble fibers.

DETAILED DESCRIPTION OF THE PREFERRED EMBODIMENTS

The present invention advantageously overcomes the deficiencies of previous flaxseed hull recovery processes by providing a significantly increased recovery of flaxseed hull, preferably with high SDG lignan content of about 5 to 7 weight percent of the total weight of the resultant purified flax product. This is surprisingly and unexpectedly achieved by providing a plurality of harvested flaxseeds, tempering the harvested flaxseeds by sufficiently increasing the moisture content for at least about one-half hour to facilitate recovery of an increased amount of hull portions from the flaxseeds, and recovering a portion of the hulls from the moisture-increased flaxseeds. It has been found now that by increasing the moisture content of the flaxseeds before the hull separation from the seed, recovery of the flaxseed hulls can be surprisingly and unexpectedly achieved on the order of at least about 7 up to 17 weight percent hull recovery, and typically on the order of about 8 up to 16 weight percent hull recovery, based on the total weight of flaxseeds. This advantageously provides a flax product with a concentrated lignan content, due to the higher hull recovery containing the bulk of the lignan, which can then be used as a nutritional supplement or ingredient in a variety of food products.

For the purposes of the present invention, "hull recovery" refers to the hull alone rather than the hull plus a portion of the seed itself that was typically considered part of the hull when using conventional separating techniques. Without being bound by theory, it is believed that flaxseeds contain approximately 18 weight percent hull based on the total weight of flaxseeds. Thus, anything purporting to achieve greater than 18 weight percent hull recovery is including more than the hull in its calculations, as hull recovery cannot be increased beyond the limit of hull contents in a flaxseed.

The present invention is directed to a method for recovering a significantly increased amount of flaxseed hull portions from a plurality of harvested flaxseeds. In an optional, but preferred embodiment, the plurality of harvested flaxseeds is provided by selecting harvested flaxseeds such that they are visually uniformly colored and contain no more than 5 percent flaxseeds of a visually distinguishable darker color. By selecting the harvested flaxseeds in this manner, the shelf stability of the resultant flax product can be advantageously increased. Such a process is disclosed in U.S. Pat. No. 6,368,750 to Pizzey, which is incorporated herein by express reference thereto.

The flaxseeds, whether or not visually uniformly color selected, are then prepared for grinding, milling, or any other suitable method of hull separation and recovery. In one optional embodiment, for example, the harvested flaxseeds are tested for moisture content and then the moisture content is sufficiently increased to facilitate recovery of an increased amount of flaxseed hulls. Preferably, an aqueous component is added to the flaxseeds to increase the moisture content to a desired level. The aqueous component is preferably water, but can also include other edible water-based materials that need not be specifically recovered before the recovered hull portions are further processed. The component used to increase the moisture content of the flaxseeds is, however, preferably at least substantially free of any alcohol or alcoholic compounds, more preferably completely alcohol free.

Without being bound by theory, it is believed that flaxseeds typically contain a moisture content of between 5 weight percent to 8 weight percent, based on the total flaxseed weight. In some flaxseeds, it may be possible to find naturally occurring flaxseeds with slightly lower or higher moisture contents, for example, 4 weight percent or 9 weight percent moisture content. Optionally, but preferably, at least a portion of representative flaxseeds are tested to determine the initial moisture content. This can advantageously permit the flaxseeds to have a standardized moisture content for tempering and separating according to the invention by adjusting the amount of moisture permitted to be absorbed during tempering, either by providing only a pre-determined quantity of moisture or by adjustingly increasing the tempering time and/or temperature.

After the moisture content is increased, for example by adding an amount of water or other aqueous component, the flaxseeds are allowed to soak up the moisture, or temper, for at least about one-half hour, optionally but preferably with intermittent mixing and resting periods. When the moisture content is initially increased, the flaxseeds tend to be very gelatinous in nature. After a few minutes, however, a portion of the moisture is absorbed into the flaxseeds, which advantageously become free flowing again and not sticky or gelatinous. Surprisingly, it has been found that increasing the moisture content of the flaxseeds by using this absorption step before attempting to mill or otherwise remove the hulls from the remainder of the flaxseeds advantageously results in an increased hull portion recovery according to the invention.

When increasing the moisture content of the flaxseeds according to the invention, it is preferable that the moisture content is increased by about 1 to 20 percent by weight of total flaxseeds before the moisture is added. Preferably, the moisture content is increased to greater than 10 weight percent or alternatively by at least about 1 weight percent of added moisture. More preferably, the moisture content is increased to about 10.5 weight percent to 20 weight percent or alternatively by at least about 2 weight percent of added moisture. Even more preferably, the moisture content is increased to about 12 weight percent to 15 weight percent or alternatively by at least 3 weight percent added moisture. Depending on any optional moisture content testing or the desired level of accuracy, the flaxseeds can be tempered by contact with water or an aqueous component. The amount of water or aqueous component can be pre-determined if desired, so that a maximum water content can be better controlled. The length of tempering time also affects the amount of water absorbed by the flaxseeds during tempering. Pre-determined amounts of water can be readily determined by those of ordinary skill in the art based on the present application including the examples herein.

The flaxseeds are preferably permitted to steep or temper in added moisture for a period of about 1 to 24 hours. More preferably, the flaxseeds are allowed to temper for about 1 to 2 hours. The amount of moisture and tempering time are preferably sufficient to permit moisture uptake while avoiding uptake of excess water that would only increase hull recovery by a small incremental amount. This can advantageously minimize or avoid excess drying that may otherwise be required later in the process after hull recovery.

Advantageously, it has been found that by increasing the moisture content of the flaxseeds according to the invention, and tempering the flaxseeds for the time periods noted herein, recovery of the flaxseed hull portions can be surprisingly and unexpectedly achieved in an amount of at least 7 up to about 17 weight percent hull, and more typically in an amount of about 8 to 16 weight percent hull, based on the total weight of flaxseeds. Without being bound by theory, preferably, a more constant and evenly distributed moisture content will tend to result the longer each batch of flaxseeds is allowed to temper. Advantageously, this facilitates a more controlled and predictable hull recovery and lignan concentration of the final product. Chemical and lignan analysis has also shown that the lignans that are extracted from the flaxseed hulls recovered by the present invention are of the same quality as those that are extracted using previously known methods, albeit now in a higher concentration of lignans per weight of the flax product. It is noted that the lignan concentration of the flax products described herein were determined using a method developed by the inventor and Alpha Laboratories, 1365 Redwood Way, Petaluma, Calif., which includes hydrolizing flaxseed hulls directly using about 0.3N to about 2N NaOH, followed by HPLC analysis and UV diode array detection at 281 nm. This analytical method is also described in U.S. patent application Ser. No. 10/395,554, which is incorporated herein by express reference thereto.

After allowing the flaxseeds to temper, the "wet" seeds may be coarsely milled or ground, for example, or subjected to any other suitable process to separate or remove the hull portions from the inner portions of the flaxseeds such that the hulls still retain mucilage, lignans and antioxidants. Preferably, the milled product is then sifted into two portions by using, for example, a vibratory sifter and screens with aperture sizes of US #12, US #14, US #16, US #18, or US #20, depending on the desired yield and size of the hull isolate to be recovered. In general, the use of larger numbered screen apertures produce lower yield, lower total fat and higher SDG values. Conversely, the use of smaller screen apertures tend to produce higher yield, higher total fat and lower SDG values. Of the two portions that are separated, the portion that remains on top of the sifter is retained as the less dense and coarser "overs". The portion that moves through the sifter aperture is the "throughs" and tend to be denser and finer in granularity. Optionally, but preferably, the "overs" or recovered hull portions may be dried before further processing.

In an optional but preferred embodiment, the "overs" may be further fractionated to isolate the flaxseed hulls by using, for example, aspiration, a procedure well known in the relevant art and which is not further disclosed herein. This step produces a portion of lighter density, the "liftings," and a portion of heavier density, the "tailings." The "liftings" are the purified flaxseed hull isolate which contains the higher or preferred lignan content. Advantageously, the yield, fat and SDG content can be affected by the degree (i.e., the amount of negative pressure applied or the feed rate of the product stream) and repetition of multiple aspiration steps. The flaxseed hull isolate may be used as is, or it may be further processed depending upon the particular application which it will be used in.

Optionally, but preferably, the dry flaxseed hull isolate may be further processed by applying an increased pressure sufficient to increase the density and reduce the microbial count of the flaxseed hull isolate. Preferably, methods of applying such increased pressure include processing the flaxseed hull isolate through an extruder or on an oil press. When the recovered hull isolate is extruded, any suitable equipment may be used. An exemplary extruder is an X-20 Wenger, spiral ribbed single screw extruder or other similar extruders. No preconditioning is necessary for use with the extruder. The hull isolates are typically fed through the extruder dry, although at the beginning of the run, drops of ambient, distilled water may be dripped into the barrel in an amount sufficient to lubricate the barrel to facilitate the feeding of the hull isolates into the extruding device. After material reaches the end of the die, the addition of distilled water into the barrel is no longer necessary. The material being extruded creates its own sheer and thus heat. Preferably, the barrel is jacketed and cooling water is circulated through for the entire duration of the extrusion. In the exemplary extruder, the first four sections of the barrel are cooled constantly. The cooling jacket on the die end, i.e., the fifth section, is only utilized when the temperature exceeds about 105° C., because it is preferable to avoid further temperature increases. A higher die temperature may create a very hard product, which may plug the die holes. Of course, it can be beneficial not to cool the first four sections, because the addition of some heat facilitates material movement through the extruder. Although extruder dies with two holes have been typically used with the inventive process, there is no reason to believe that dies with fewer or more holes would not adequately function to accomplish the task at hand. Therefore, any suitable extruder may be used.

Because flaxseed hull isolates with too high an oil content can cause surging during extrusion, oil pressing has been developed as another suitable method according to the present invention of applying an increased pressure to the flaxseed hull isolate. Oil pressing may optionally but preferably include pre-conditioning the hull isolate with, for example, a heat treatment of about 70° C. to 110° C., preferably about 85° C. to 95° C. for about 30 minutes to 3 hours. An exemplary pre-treatment is to expose the hull isolate to 90° C. for about 1 hour. The hull isolate may then be pressed by slowly feeding the product into a mechanical screw press. Initially, it is preferable that the barrel of the press is preheated to about 100° C. to 125° C. After the hull isolate begins flowing through the press, application of external heat is discontinued. The sheer of the flaxseed hull isolate in the press will advantageously tend to produce adequate heat to facilitate the removal of the oil from the hull isolate. Consistent results can be obtained by optimizing the hull isolate feed rate, screw speed, and die selection, as will be readily apparent to those of ordinary skill in the art based on the present application. In a preferred embodiment, dies ranging in sizes from about ¼ to ⅜ inches tend to be most appropriate.

In addition to increasing density and reducing the microbial count, oil pressing the flaxseed hull isolates also advantageously reduces the fat content of the isolates. Oil pressing can reduce fat content in the flaxseeds by at least about 3 percentage points, preferably at least about 4 percentage points, and more preferably at least about 5 percentage points. Any post-hull recovery processing according to the invention, e.g., extrusion or oil pressing, advantageously completely avoids the need for solvent extraction, e.g., to decrease fat content in the hull isolate.

Advantageously, these hull isolate processing methods (extrusion, oil pressing, or any other suitable process) minimize oxidation of the flax products, thereby increasing shelf stability. Without being bound by theory, it is believed that this is due to a reduction in the oil content following extrusion, oil pressing, or the like. Further, reduction in oil content provides a lower fat alternative, as well as increasing the bulk density of the flaxseed hull isolate. The bulk density can be increased through either these methods to about 25 to 50 lbs/ft$^2$, preferably to about 35 to 40 lbs/ft$^2$. An increased bulk density can advantageously facilitate formulation of the flaxseed hull isolate, or flax product, into a consumer-friendly end product.

Once the flaxseed hull isolate reaches the end of the die, it is preferably cut into desired lengths, e.g., consistent lengths, of flax meal pellets or flax product or ground up to be used in capsules, tablets, or other formulations. The pellets fall onto a screened vibratory feeder and any residual oil drips through the screen and empties into collection tanks. Oil that drips directly out of the press is also collected in tanks. The pellets may be collected and stored for subsequent processing, for example, lubrication while grinding, or for other uses. The size or shape of the pellets is not an important factor inasmuch as the resultant product may later be ground to the preferred size. For example, a food fortification application may require a mesh size of approximately 30 mesh, whereas a dietary supplement tablet application may require a mesh size of 80 mesh. In another embodiment, various grinders can be used for preparing the flax product, however, mesh sizes finer than 40 mesh may require cryogenic pre-cooling, e.g., to ensure the recovered hull portions are not damaged.

Surprisingly, by drastically increasing the hull portion recovery according to the invention, the resultant flax product includes a higher concentration of lignans of at least about 10 percent by weight than conventional flaxseed products. Preferably, the concentration of lignans of the resultant flax product is higher by at least about 100 percent by weight compared to conventional flaxseed products, and more preferably, by at least about 300 to 400 percent by weight. The flax product of the invention also includes a mixture of dietary fibers, preferably more soluble dietary fibers than insoluble dietary fibers, as well as fats, i.e., a portion of oil that is not separated or otherwise extracted during processing.

Another variant of the present invention is that processing the flaxseed hull isolate surprisingly and unexpectedly lowers the microbial counts, without any impairment of shelf stability, of the flax product. In fact, the present flaxseed hull isolate and flax products typically exhibit shelf stability, e.g., for at least about six months or preferably up to about one year. This is due to the fact that pressing or extruding the flaxseed hull isolate creates mechanical sheer, which produces sufficient heat to pasteurize the flax product. The pasteurization reduces the microbial counts of the flaxseeds being processed such that the flax product is at least substantially free of microbes including yeasts, bacteria, and other similar pathogens. Shelf stability of the flax product is also enhanced because there is less oil in the product that can oxidize, which tends to cause instability over time.

Processing the flaxseed hull isolate using an oil press of the invention also advantageously reduces the fat content of the product. Although not wishing to be bound by theory, it is believed that flaxseed typically contains about 30 to 40 weight percent fat. After removal of oil from the flaxseed hull isolate using an oil press, the fat content of the flax product preferably has a fat content of only about 5 to 12 weight percent. More preferably, the flax product has a fat content of about 6 to 10 weight percent. Advantageously, the resultant flax product has a low enough fat content that it can be directly sold and used commercially as a nutritional supplement or ingredient. Further extraction of the lignans from the flax product using, for example, alcohols or other volatile or environmentally unfriendly solvent extraction chemical products is not necessary or desired. Therefore, the flax product of the invention permits a greater concentration of lignans in the increased hull portions recovered, which permits consumers to eat a much smaller quantity of flaxseed hull isolate according to the invention while still obtaining the 250 mg of lignans desired to prevent, treat, or manage various symptoms as discussed herein.

An additional feature of the present invention is that the flax product that is produced contains a higher ratio of soluble dietary fiber to insoluble dietary fiber than full fat milled flaxseed. Typically, dietary fiber accounts for about 50 to 70 weight percent of the total fiber of flaxseeds. In prior art flax meals, total dietary fiber in flax meal typically had 60 percent to 70 percent insoluble dietary fiber to 30 percent to 40 percent soluble dietary fiber. The flax product described herein, however, has about 30 percent to 50 percent insoluble dietary fiber and 50 percent to 70 percent soluble dietary fiber. Preferably, the flax product has about 32 percent to 48 percent insoluble dietary fiber and 52 percent to 68 percent soluble dietary fiber. Even more preferably, the flax product has 35 percent to 45 percent insoluble dietary fiber and 55 percent to 65 percent soluble dietary fiber.

In another embodiment, the flax product contains a fiber content that is sufficient to generate a prebiotic bacteria culture in the large intestine of a mammal. This is important because, without such a bacteria, some mammals would not be able to sufficiently digest or process the plant lignans into a useful and nutritional mammalian lignan form. Thus, without being bound by theory, it is believed that a fiber-lignan complex containing as many soluble fibers as insoluble fibers will facilitate prebiotic bacterial growth in a patient that will facilitate conversion of plant lignan to mammalian lignan.

The resultant flax product of the invention, i.e., the flax hull isolate, can be incorporated into a variety of useful end products for consumer use. A few examples include foods, pharmaceuticals, cosmetics or cosmeceuticals, nutritional supplements, food additives, or animal feeds. Particularly preferred food products include yogurt. Particularly in the case of pharmaceuticals, cosmetics or cosmeceuticals, the flax products can be included in lotions, creams, shampoos, or the like. Although any suitable route of administration of pharmaceuticals incorporating the flax products is suitable, preferably they are orally administered. In the case of animal feeds, the feed containing flax product according to the invention can promote healthy skin or fur coats in pets, such as dogs or other animals with fur.

For food products prepared according to the invention, the increased hull recovery in flax products of the present invention permits a greatly decreased amount of flax product to provide the same desired level of natural lignans in a food product, or any of the other preferred end products noted above. Therefore, while approximately 30 g to 40 g of flaxseeds might be required to obtain 0.25 g of natural lignans, flax products according to the invention can be provided in an amount of about 1 g to 10 g to provide the same natural lignan equivalency. Preferably, flax products having a weight of about 4 to 7 g can be incorporated into a food product and still contain the desired 0.25 g of natural lignans. Even more preferably, 5 g of the inventive flax product can contain the desired 0.25 g of natural lignans.

The flax product of the present invention also has antioxidant activity of typically 40,000 TE to 50,000 TE (Trolox Equivalents) per 100 grams of product. Preferably, the flax product has an antioxidant activity of about 42,000 TE to 48,000 TE per 100 grams of product. More preferably, the flax product has an antioxidant activity of about 45,000 TE per 100 grams of product. As shown below in Table 1, this is significantly higher than the antioxidant activity of other foods considered to be high in antioxidant activity.

TABLE 1

| Food | Antioxidant activity (TE/100 grams) |
|---|---|
| Flax-Lignan-Fiber Complex | 40,000-50,000 |
| Red Grapes | 1,350 |
| Red Cabbage | 1000 |
| Broccoli Flowers | 500 |
| Spinach | 500 |
| Green Grapes | 400 |
| Tomato | 300 |
| Green Beans | 175 |
| Lima Beans | 1,055 |
| Red Beans | 11,459 |
| Blueberries | 3,300 |
| Raisins | 5,900 |
| Wheat Bran | 4,620 |
| Wheat Flour (refined) | 600 |

The term "about," as used herein, should generally be understood to refer to both numbers in a range of numerals. Moreover, all numerical ranges herein should be understood to include each whole integer within the range.

The term "shelf stability," as used herein, should generally be understood to mean that the product does not require any refrigeration and can be stored at room temperature, i.e., under ambient conditions, with substantially no spoilage or microbiological growth over a period of time. In the case of the present invention, this shelf stability is at least about 6 months, preferably at least about 1 year.

The term "substantially free," as used herein, refers to less than about 10 weight percent, preferably less than about 5 weight percent, and more preferably less than about 1 weight percent based on the total weight of flaxseeds of the undesirable component, e.g., alcohol or alcoholic compounds in the case of the moisture content. In one more preferred embodiment, the term means less than about 0.1 weight percent of the undesired component. The term "completely free" means no more than a trace amount of such undesired materials are present, e.g., as an impurity.

The term "substantially unchanged," as used herein, refers to a moisture content that is modified in an amount of less than about 10 weight percent, preferably less than about 5 weight percent, after tempering and before the hull recovery process occurs.

The term "weight percent," as used herein, is based on the total weight of the flaxseed(s) unless otherwise noted.

The term "flax product," as used herein, is analogous to the term "Flax-Lignan-Fiber Complex."

EXAMPLES

The present invention is illustrated by the following Examples that are merely for the purpose of illustration and are not to be regarded as limiting the scope of the invention or the manner in which it can be practiced. In each Example, each lot of harvested flaxseeds was initially tested and determined to have a moisture content of 5.5 percent. The "overs" were dried after milling at a temperature of 60° C. to 70° C. Additionally, a higher yield than noted in these Examples may be obtained, if desired, by routine optimization using a coarser milled product, a finer screen, and a more aggressive aspiration.

Example 1

Hull Recovery from Flaxseeds Boosted to 15% Moisture per the Invention

The harvested flaxseeds were allowed to temper in water for 21 hours to increase the moisture content of the flaxseeds up to 15.0 percent. A batch of 12.5 lbs. of tempered flaxseeds (including moisture weight due to the tempering 9.16 pounds flaxseeds having natural 5.5 percent moisture content) were then milled, dried, sifted, and aspirated. The process surprisingly and unexpectedly yielded a flaxseed hull isolate recovery of 13.1 percent based on the initial flaxseed weight (dry matter weight) before having moisture added for processing according to the invention.

| Tempered Flaxseed | Dry Matter Weight | After Sifting | After Aspirations | Recovered Hull Isolate | Percent Recovered |
|---|---|---|---|---|---|
| 12.5 lbs. | 9.16 lbs. | 7.6 lbs. (overs) 4.7 lbs. (throughs) | 1.2 lbs. (liftings) | 1.2 lbs | 13.1% |

Example 2

Hull Recovery from Flaxseeds Boosted to 12.5% Moisture per the Invention

The harvested flaxseeds were allowed to temper in water for 21 hours to increase the moisture content of the flaxseeds up to 12.5 percent. A batch of 12.3 lbs. of tempered flaxseeds (including added moisture) were then milled, dried, sifted, and aspirated. The process surprisingly and unexpectedly yielded a flaxseed hull isolate recovery of 12.5 percent based on the initial flaxseed weight.

| Tempered Flaxseed | Dry Matter Weight | After Sifting | After Aspirations | Recovered Hull Isolate | Percent Recovered |
|---|---|---|---|---|---|
| 12.3 lbs. | 9.6 lbs. | 7.5 lbs. (overs) 4.7 lbs. (throughs) | 1.2 lbs. (liftings) | 1.2 lbs | 12.5% |

Control Example 3

Hull Recovery from Flaxseeds with Inherent 5.5% Moisture

This trial served as a control. The harvested flaxseeds were provided in an amount of 30 lbs. The moisture content of the flaxseeds was not increased, but instead remained at its inherent 5.5 weight percent of the total flaxseed. The flaxseeds were milled, dried, sifted, and aspirated as before. The process yielded a flaxseed hull isolate recovery of only 3 percent based on the original weight of the flaxseeds.

| Tempered Flaxseed | Dry Matter Weight | After Sifting | After Aspirations | Recovered Hull Isolate | Percent Recovered |
|---|---|---|---|---|---|
| 30 lbs. | 30 lbs. | 7.8 lbs. (overs) 22.1 lbs. (throughs) | 0.9 lbs. (liftings) | 0.9 lbs | 3% |

Example 4

Hull Recovery from Flaxseeds Boosted to 12.5% Moisture per the Invention

The harvested flaxseeds were allowed to temper in water for 1 hour to increase the moisture content of the flaxseeds up to 12.5 percent. A batch of 21.9 lbs. of tempered flaxseeds were then milled, dried, sifted, and aspirated. The process surprisingly and unexpectedly yielded a flaxseed hull isolate recovery of 10.9 percent based on the initial flaxseed weight.

| Tempered Flaxseed | Dry Matter Weight | After Sifting | After Aspirations | Recovered Hull Isolate | Percent Recovered |
|---|---|---|---|---|---|
| 21.9 lbs. | 19.2 lbs. | 9.4 lbs. (overs) 12.4 lbs. (throughs) | 2.1 lbs. (liftings) | 2.1 lbs | 10.9% |

Where the flaxseeds of the invention were tempered for 21 hours in Examples 1-2, the recovery of hulls was surprisingly and unexpectedly increased by more than 400 percent compared to the hull recovery without tempering as described in Control Example 3. In Example 4, with only one hour of tempering the flaxseeds, the hull recovery was still surprisingly and unexpectedly more than 333 percent compared to Control Example 3. Thus, the present invention surprisingly and unexpectedly permitted an advantageous increase in hull recovery from approximately 16.667 weight percent of the theoretical maximum possible using conventional processes up to more than 66.67 weight percent of the theoretical maximum possible hull recovery for two of the three examples according to the present invention.

While illustrative embodiments of the invention are disclosed herein, it will be appreciated that numerous modifications and other embodiments may be devised by those of ordinary skill in the art. Therefore, it will be understood that the appended claims are intended to cover all such modifications and embodiments that come within the spirit and scope of the present invention.

What is claimed is:

1. A method for increasing the amount of hull portions recovered from flaxseeds each having a hull and a seed, which comprises:
   providing a plurality of harvested flaxseeds;
   tempering the harvested flaxseeds by sufficiently increasing the moisture content to greater than 10 weight percent based on the weight of the flaxseeds for up to about two hours to facilitate recovery of an increased amount of hull portions separated from the seeds;
   recovering a portion of the hulls having the increased moisture content, wherein the hull recovery is at least substantially free of the seed; and
   then drying the recovered hulls.

2. The method of claim 1, wherein the moisture content consists essentially of water.

3. The method of claim 1, wherein the moisture content is increased to about 10.5 to 20 weight percent based on the weight of the flaxseeds.

4. The method of claim 1, wherein the moisture content is increased for a time of about one-half hour to two hours.

5. The method of claim 1, wherein the harvested flaxseeds are selected to be visually uniformly colored having no more than 5 percent flaxseeds that are of a visually distinguishable darker color.

6. The method of claim 1, wherein recovery of the hull portions comprises milling the flaxseeds to separate hull portions from an inner portion.

7. The method of claim 1, wherein the hull portions are recovered directly after tempering so the flaxseed moisture content remains substantially unchanged.

8. The method of claim 1, wherein the recovered hull portions are dried after milling to reduce excess moisture content.

9. The method of claim 8, further comprising:
   sifting the hull portions into a first portion that is lighter in density and coarser, and a second portion that is denser and finer in granularity; and
   aspirating the first portion into a third portion of lesser density than a fourth portion of greater density;
   wherein the third portion comprises the recovered hull portions.

10. The method of claim 1, further comprising processing the recovered hull portions using an oil press or an extruder, at a temperature of about 70° C. to 125° C., to extract a portion of oil from the recovered flax hull portions.

11. The method of claim 10, wherein the oil press is applied after recovery of the hull portions and produces sufficient heat to pasteurize the recovered hull portions.

12. A flax product produced according to the method of claim 11 that is shelf stable for at least about six months.

13. A flax product produced according to the method of claim 1, having a ratio of dietary fiber content comprising about 30 percent to 45 percent insoluble dietary fiber compared to 55 percent to 70 percent soluble dietary fiber.

14. A flax product produced according to the method of claim 1, having an antioxidant activity of about 40,000 TE to 50,000 TE per 100 grams.

15. A flax product produced according to the method of claim 10, having a fat content of about 5 to 12 weight percent.

16. A food product or nutritional supplement prepared according to the method of claim 10, wherein the recovered hull portions have a fat content of about 5 to 12 weight percent and provided that the method is without solvent extraction.

17. A flaxseed hull isolate consisting essentially of:
   at least 7 up to 17 weight percent of flaxseed hull based on the total weight of flaxseeds; and a fat content of about 5 to 12 weight percent, wherein the hull isolate comprises a moisture content that consists essentially of an aqueous component.

18. A flax product comprising:

at least 10 weight percent lignans;

a fat content of about 5 to 12 weight percent; and sufficient fiber content of which at least 50 percent is soluble fibers to generate a prebiotic bacteria culture in a mammalian large intestine when consumed.

19. A method for increasing the amount of hull portions recovered from flaxseeds each having a hull and a seed, which comprises:

providing a plurality of harvested flaxseeds;

tempering the harvested flaxseeds by sufficiently increasing the moisture content, which is substantially free of alcohol, for tip to about two hours to facilitate recovery of an increased amount of hull portions separated from the seeds;

recovering a portion of the hulls having the increased moisture content, wherein the hull recovery is at least substantially free of the seed; and then drying the recovered hulls.

20. The method of claim 19, wherein the moisture content contains less than about 0.1 weight percent of alcohol based on the total weight of flax seeds.

21. The method of claim 19, wherein the moisture content consists essentially of an aqueous component.

22. A method of preparing a flax product comprising the method of claim 19, provided that the recovering of the portion of the hulls is without solvent extraction.

\* \* \* \* \*

UNITED STATES PATENT AND TRADEMARK OFFICE
CERTIFICATE OF CORRECTION

PATENT NO. : 7,595,078 B2  
APPLICATION NO. : 11/079335  
DATED : September 29, 2009  
INVENTOR(S) : Glenn Roy Pizzey Page 1 of 1

It is certified that error appears in the above-identified patent and that said Letters Patent is hereby corrected as shown below:

Column 14, claim 19, line 1: Please change "tip" to --up--.

Signed and Sealed this

Fifteenth Day of December, 2009

David J. Kappos  
*Director of the United States Patent and Trademark Office*

UNITED STATES PATENT AND TRADEMARK OFFICE
CERTIFICATE OF CORRECTION

PATENT NO. : 7,595,078 B2  
APPLICATION NO. : 11/079335  
DATED : September 29, 2009  
INVENTOR(S) : Glenn Roy Pizzey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 601 days.

Signed and Sealed this

Twenty-eighth Day of September, 2010

David J. Kappos  
*Director of the United States Patent and Trademark Office*